(12) United States Patent
Ederer et al.

(10) Patent No.: US 12,240,168 B2
(45) Date of Patent: Mar. 4, 2025

(54) METHOD AND DEVICE FOR PRODUCING 3D MOULDED PARTS BY MEANS OF A LAYER CONSTRUCTION TECHNIQUE

(71) Applicant: Voxeljet AG, Friedberg (DE)

(72) Inventors: Ingo Ederer, Geltendorf (DE); Daniel Günther, Munich (DE); Johannes Günther, Martinsried (DE); Christoph Scheck, Augsburg (DE)

(73) Assignee: VOXBLJET AG, Friedberg (DE)

( * ) Notice: Subject to any disclaimer, the term of this patent is extended or adjusted under 35 U.S.C. 154(b) by 0 days.

(21) Appl. No.: 16/867,170

(22) Filed: May 5, 2020

(65) Prior Publication Data

US 2020/0262141 A1 Aug. 20, 2020

Related U.S. Application Data

(62) Division of application No. 15/538,019, filed as application No. PCT/DE2015/000598 on Dec. 18, 2015, now Pat. No. 10,682,809.

(30) Foreign Application Priority Data

| Dec. 22, 2014 | (DE) | ...................... | 10 2014 018 914.7 |
| Feb. 6, 2015 | (DE) | ...................... | 10 2015 001 409.9 |
| May 27, 2015 | (DE) | ...................... | 10 2015 006 533.5 |

(51) Int. Cl.
*B29C 64/165* (2017.01)
*B29C 64/264* (2017.01)
*B29C 64/295* (2017.01)
*B29C 64/35* (2017.01)
*B29C 64/357* (2017.01)
*B29C 67/00* (2017.01)

(52) U.S. Cl.
CPC .......... *B29C 64/165* (2017.08); *B29C 64/264* (2017.08); *B29C 64/295* (2017.08); *B29C 64/35* (2017.08); *B29C 64/357* (2017.08); *B29C 67/00* (2013.01)

(58) Field of Classification Search
CPC ........................... B29C 64/165; B29C 64/264
See application file for complete search history.

(56) References Cited

U.S. PATENT DOCUMENTS

| 3,913,503 A | 10/1975 | Becker |
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |

(Continued)

FOREIGN PATENT DOCUMENTS

| AU | 720255 B2 | 5/2000 |
| DE | 3221357 A1 | 12/1983 |

(Continued)

OTHER PUBLICATIONS

US 4,937,420 A, 06/1990, Deckard (withdrawn)

(Continued)

*Primary Examiner* — Joseph A Miller, Jr.
(74) *Attorney, Agent, or Firm* — The Dobrusin Law Firm, P.C.

(57) ABSTRACT

The invention relates to a method and an apparatus for producing three-dimensional models by layering in a high-speed sintering process.

22 Claims, 13 Drawing Sheets

(56) References Cited

U.S. PATENT DOCUMENTS

| | | |
|---|---|---|
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |

(56) References Cited

U.S. PATENT DOCUMENTS

| | | |
|---|---|---|
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0259433 A1* | 11/2005 | Nishizaki ............ B29C 65/1432 362/520 |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2007/0241482 A1 | 10/2007 | Giller |
| 2007/0260349 A1* | 11/2007 | John .................. G03F 7/70291 700/118 |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0190905 A1* | 8/2008 | Heinlein ............... B29C 64/153 219/121.73 |
| 2008/0233302 A1 | 9/2008 | Elsner et al. |
| 2008/0237933 A1 | 10/2008 | Hochmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0212584 A1 | 8/2010 | Ederer et al. |
| 2010/0207288 A1 | 9/2010 | Enrico |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |

(56) References Cited

U.S. PATENT DOCUMENTS

| | | |
|---|---|---|
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0314613 A1* | 10/2014 | Hopkinson ............ B29C 64/153 419/55 |
| 2014/0322501 A1 | 10/2014 | Ederer et al. |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0273632 A1 | 10/2015 | Chen |
| 2015/0273769 A1* | 10/2015 | Korn .................. B29C 64/118 264/405 |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |
| 2017/0239889 A1 | 8/2017 | Ganapathiappa |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0326662 A1 | 11/2018 | Gunther et al. |
| 2018/0369910 A1 | 12/2018 | Gunter et al. |
| 2019/0047218 A1 | 2/2019 | Ederer et al. |
| 2019/0084229 A1 | 3/2019 | Gunther |
| 2020/0055246 A1 | 2/2020 | Gunther et al. |
| 2020/0130263 A1 | 4/2020 | Gunther et al. |

FOREIGN PATENT DOCUMENTS

| | | |
|---|---|---|
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 10104732 C1 | 6/2002 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 361847 B1 | 4/1990 |
| EP | 0431924 B1 | 3/1994 |
| EP | 1415792 | 5/2004 |
| EP | 1457590 A | 9/2004 |
| EP | 1381504 B1 | 8/2007 |
| EP | 1740367 B1 | 11/2009 |
| EP | 1648686 B1 | 12/2009 |
| GB | 2297516 A | 8/1996 |
| GB | 2422344 A | 7/2006 |
| JP | S62275734 A | 11/1987 |
| JP | 2003136605 A | 5/2003 |
| JP | 2004082206 A | 3/2004 |
| JP | 2009202451 A | 9/2009 |
| WO | 01/40866 A2 | 6/2001 |
| WO | 2001/078969 A2 | 10/2001 |
| WO | 2004/014637 A1 | 2/2004 |
| WO | 2005/011959 A1 | 2/2005 |
| WO | 2005/090055 A1 | 9/2005 |
| WO | 2006/100166 A1 | 9/2006 |
| WO | 2008/049384 A1 | 5/2008 |
| WO | 2008061520 A2 | 5/2008 |
| WO | 2011063786 A1 | 6/2011 |
| WO | 2013/021173 A1 | 2/2013 |
| WO | 2013075696 A1 | 5/2013 |
| WO | WO210/059958 * | 4/2014 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

International Search Report for application No. PCT/DE2015/000598 mailed on Mar. 31, 2016.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-33.

(56) References Cited

OTHER PUBLICATIONS

Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

\* cited by examiner

METHOD AND DEVICE FOR PRODUCING 3D MOULDED PARTS BY MEANS OF A LAYER CONSTRUCTION TECHNIQUE

CLAIM OF PRIORITY

The present application is a divisional patent application of U.S. National Phase patent application Ser. No. 15/538,019 filed on Jun. 20, 2017, which claims priority to PCT Patent Application PCT/DE2015/000598 filed on Dec. 18, 2015, and to German Patent Applications DE 10 2014 018 914.7 filed on Dec. 22, 2014, DE 10 2015 001 409.9 filed on Feb. 6, 2015, and DE 10 2015 006 533.5 filed on May 27, 2015, the contents of which are each incorporated herein by reference in its entirety. The present application claims priority to U.S. National Phase patent application Ser. No. 15/538,019, PCT Patent Application PCT/DE2015/000598, and German Patent Applications DE 10 2014 018 914.7, DE 10 2015 001 409.9, and DE 10 2015 006 533.5.

FIELD

The invention relates to a method and a device for producing 3D models by means of a layer construction technique.

BACKGROUND

European Patent EP 0 431 924 B1 describes a process for producing three-dimensional objects, based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction cylinder and provided with a new layer of particulate material, the latter also being printed on as described above. These steps are repeated until a certain desired height of the object is achieved. Thus, the printed and solidified regions form a three-dimensional object.

Upon completion, the object made of solidified particulate material is embedded in loose particulate material, from which it is subsequently freed. For this purpose, a suction device may be used, for example. This leaves the desired objects which then have to be freed from any residual powder, e.g. by brushing it off.

Other powder-based rapid prototyping processes (also referred to as layered construction of models or layer construction techniques), e.g. selective laser sintering or electron beam sintering, work in a similar manner, also applying loose particulate material layer by layer and selectively solidifying it with the help of a controlled physical source of radiation.

In the following, all these processes will be understood to be covered by the term "three-dimensional printing methods" or "3D printing methods".

3D printing on the basis of pulverulent materials and introduction of liquid binders is the quickest method among the layer construction techniques.

This method allows various particulate materials, including polymeric materials, to be processed. However, it has the disadvantage that the particulate material bed cannot exceed a certain bulk density, which is usually 60% of the particle density. The strength of the desired components significantly depends on the achieved density, however. Insofar it would be required here for high strength of the components to add 40% or more by volume of the particulate material in the form of liquid binder. This is not only a relatively time-consuming process due to the single-droplet input, but it also causes many process-related problems, which are given, for example, by the inevitable shrinkage of the liquid volume during solidification.

In another embodiment, which is known in the art as "high-speed sintering", or HSS for short, solidification of the particulate material is effected by input of infrared radiation. The particulate material is thus bonded physically by a fusing process. In this case, advantage is taken of the comparatively poor absorption of thermal radiation in colourless plastic materials. Said absorption can be increased multiple times by introducing an IR acceptor (absorber) into the plastic material. The IR radiation can be introduced by various means, e.g. a bar-shaped IR lamp, which is moved evenly over the construction field. Selectivity is achieved by the specific printing of the respective layer with an IR acceptor.

In the printed locations, the IR radiation thereby couples much better into the particulate material than in the unprinted regions. This results in selective heating within the layer beyond the melting point and, consequently, in selective solidification. This process is described, for instance, in EP1740367B1 and EP1648686B1 and will be abbreviated below as HSS.

Various materials are known from the laser sintering process which can be processed with this method as well. By far the most important material in this context is polyamide 12. There are several manufacturers for this material. The strengths achieved are excellent for layer construction methods.

The material is available as a fine powder which can be processed directly in this quality. Due to the manufacturing process, however, costs are high and may exceed the cost of standard polyamide by a factor of 20-30.

In the HSS (high speed sintering) process of the prior art, just as in laser sintering, the powder is brought to a temperature near the melting point of the material for processing. This causes the powder to "age" and limits its use in subsequent processes. A low recycling rate results, which has a negative effect on process costs.

The precision of the parts is significantly influenced by process control. Thus, the homogeneity of parameters such as powder bed density and temperature in the construction space is decisive.

The known HSS methods have a multitude of disadvantages concerning, on the one hand, the recycling rate and, on the other hand, process costs, consequently increasing the cost per piece and making it rather expensive. In particular, the aging of the powder is a crucial problem, and the resulting low recycling rate is a great hindrance for this process to become more widespread. Currently, approx. 50% of the powder not incorporated in parts has to be replaced after a process. At powder prices of approx. €80/kg and with construction volumes of several hundred litres, this requires high financial investments.

One approach to solving the process-related problems, thereby reducing costs, is the use of less expensive powders. However, this approach has narrow limits, because most powders do not have a sufficient "sintering window" to be safely processed. This means that stable process parameters are hard to find for these powders.

Another approach is to chemically limit powder aging. In this case, machines flushed with nitrogen are common in laser sintering, for example. This can prevent powder oxidation. However, for process-related reasons alone, aging cannot be fully restricted, because part of the solidification reaction occurs by a secondary reaction of the polymer. Curbing this secondary reaction would mean essential limitations in strength.

One problem with known HSS methods is the adjustment of advantageous process conditions, such as, for example, the temperature windows with respect to the particulate materials used. The HSS process combines a great number of process parameters and the 3D printing machines used therein have a great number of constructive features and components, which makes it difficult to combine suitable components and adjust an advantageous or improved process sequence allowing improved process conditions. In many cases, it is impossible to determine what constructive changes are required in order to achieve acceptable process results and obtain high-quality 3D parts and/or optimise the process.

Another problem in adjusting the process conditions is to combine the process conditions such that, on the one hand, a sufficiently strong component is manufactured with desired and advantageous properties, while at the same time subjecting the particulate material that is not to solidify to process conditions enabling easy unpacking. One problem in this regard is that the surrounding material solidifies too much in the process and is therefore difficult to remove from the component requires increased effort to do so.

SUMMARY

It was therefore an object of the present invention to provide constructional means allowing an improved HSS process or at least improving or altogether avoiding the disadvantages of the prior art.

Another object of the invention was to provide improved process conditions in the HSS process or to achieve improved process results by specific selection of device components and/or adjustment of process conditions.

Another problem and a further disadvantage in the manufacture of 3D moulded parts by HSS are temperature gradients which occur across the surface of the component to be manufactured and in the construction material surrounding the component up to the peripheral areas of the construction platform. This involves disadvantages that either interfere with the process itself or result in drawbacks to quality, e.g. curling, warping, inaccuracy of the moulded part or increased wastage.

During the HSS process, the surface temperature of the powder bed is cyclically increased and decreased selectively, and at the end of the construction process, the finished moulded part is cooled off completely.

Ideally, the temperature in the moulded part to be constructed should be constantly at a value of just above the solidification temperature, if possible, and should vary in the construction zone only within a narrow temperature band which exceeds the melting point of the powder. Due to the emission and thermal conduction into the surrounding particulate material, the edge of the moulded part cools off quicker than internal regions, which results in undesired temperature differences in the moulded part, along with the above-mentioned disadvantages.

Accordingly, another object of the present invention is to provide a method, a material system and/or a device helping to reduce or altogether preventing aging of any unincorporated powder due to thermal damage.

It was another object of the present invention to provide a method which allows a constant, controllable and/or essentially uniform temperature distribution to be achieved in the 3D moulded part to be produced and/or in the construction material surrounding the moulded part during the construction process and/or to avoid, or at least reduce, excessively high and unfavourable temperature gradients across the construction surface.

BRIEF SUMMARY OF THE DISCLOSURE

In one aspect, the disclosure relates to a method of producing 3D moulded parts, wherein particulate construction material is applied onto a construction field in a defined layer by means of a coater, one or more liquids or particulate material of one or more absorbers is/are selectively applied, this layer is heated in a first heating step to a basic temperature of the powder without the absorber, which is within the sintering window of the, e.g., polyamide powder, and a second sintering step leads to selective solidification, by heat input, of the areas printed with absorber, at a sintering temperature above the melting temperature of the powder, wherein the areas with the selectively applied absorber heat up more in the first step than the areas without absorber, and thus a temperature difference is adjusted between areas with and without absorber, the construction field is lowered by one layer thickness, or the coater is raised by one layer thickness, these steps are repeated until the desired 3D moulded part is produced, wherein the heating step to said basic temperature is effected by an emitter with a wavelength of approximately 3-8 µm, preferably approximately 5 µm, and the sintering step is effected by an emitter with a wavelength of approximately 0.5-1.5 µm, preferably 0.9-1.1 µm, more preferably 1 µm.

In an alternative aspect, the disclosure relates to a method of producing 3D moulded parts, wherein particulate construction material is applied onto a construction field in a defined layer by means of a coater, one or more liquids or particulate material of one or more absorbers is/are selectively applied, this layer is heated, wherein the areas with the selectively applied absorber heat up more than the areas without absorber, and thus a temperature difference is set between areas with and without absorber, the construction field is lowered by one layer thickness, or the coater is raised by one layer thickness, these steps are repeated until the desired 3D moulded part is produced, and additional absorber is printed around the 3D moulded part in order to produce at least one jacket at a temperature which is increased at least with respect to the surrounding particulate material.

In an alternative aspect, a temperature difference is achieved locally with the same heat or energy input, by applying different absorbers or by different amounts of absorber.

In a further aspect, the disclosure relates to a 3D moulded part produced using an absorber, said 3D moulded part being surrounded, substantially along its entire circumference, by a jacket with an increased temperature, said jacket having been constructed using an absorber, there being unsolidified particulate construction material between the 3D moulded part and the jacket.

In a third aspect, the disclosure relates to a device which is suitable to carry out a method according to the invention.

In another aspect, which can also be combined with the other aspects as disclosed herein, the disclosure relates to a device and a method wherein the temperature adjustment of the particulate material and of the areas which are to solidify in the particulate material is effected by at least two emitters (sintering lamps) or one emitter with different wavelengths and/or energy input.

DETAILED DESCRIPTION OF THE DISCLOSURE

Figure 1:
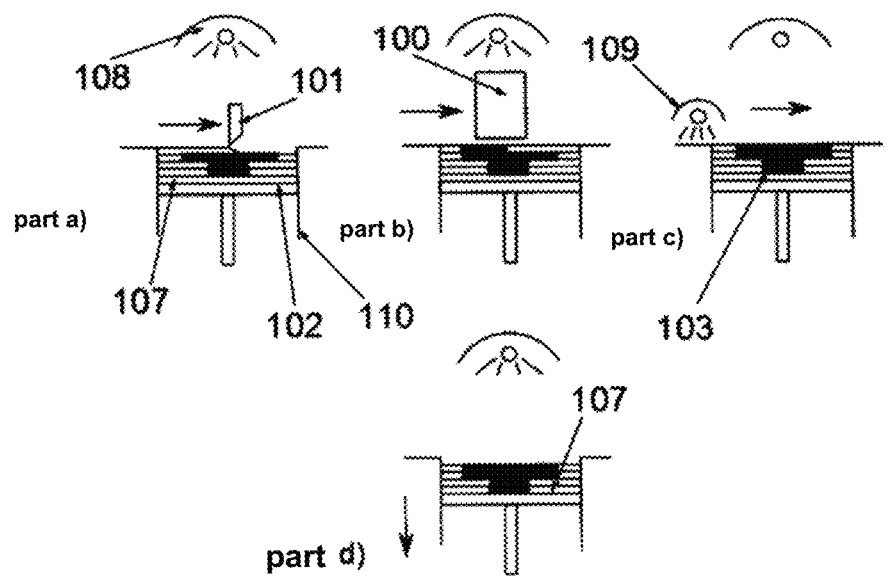
FIG. 1 is a drawing showing an illustrative sequence of process steps which may be employed for building components.

According to the invention, an object underlying the application is achieved by specifically combining advantageous building components and process parameters which result in advantageous process results.

According to the invention, further objects underlying the application are achieved by using the immediate vicinity of the parts for active heat insulation around the component by a certain amount of the absorber. This results in a smaller temperature gradient between the component and the surrounding particulate material, which prevents cooling to below the solidification temperature of the particulate material and requires a large amount of the surrounding powder to be heated only to a much lower temperature than previously required.

Thus, on the whole, the powder can be processed in the machine at a lower temperature or with a lower temperature input or energy input, and powder aging due to thermal damage can be reduced substantially. Merely a small volume around the component has to be discarded due to the considerable thermal effect.

Further, with the temperature now being better controllable and the temperature distribution being more uniform within and across the component to be constructed and the surrounding peripheral areas, an improved manufacturing result is achieved, without considering the absorber.

First of all, several terms according to the invention will be explained in more detail below.

A "3D moulded part", "moulded article" or "component" in the sense of the invention are all three-dimensional objects manufactured by means of the method according to the invention and/or the device according to the invention which exhibit dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually is a conveyor belt and limiting side walls. The construction space can also be designed in the form of what is called a job box, which constitutes a unit that can be moved in and out of the device and allows batch production, with one job box being moved out after completion of a process to allow a new job box to be moved into the device immediately, thereby increasing both the production volume and, consequently, the performance of the device.

The "heating phase" refers to heating of the device at the beginning of the process. The heating phase is complete as soon as the actual temperature of the device reaches a stationary value.

The "cooling phase" refers to the time required to cool the particulate material to such an extent that the parts contained therein are not subject to any significant plastic deformation when removing them from the construction space.

The "particulate materials" or "particulate construction materials" or "construction materials" of use herein may be any materials known for powder-based 3D printing, in particular polymers, ceramics and metals. The particulate material is preferably a free-flowing powder when dry, but may also be a cohesive, cut-resistant powder or a particle-charged liquid. In this specification, particulate material and powder will be used synonymously.

The "particulate material application" is the process of generating a defined layer of powder. This may be done either on the construction platform or on an inclined plane relative to a conveyor belt in continuous principles. The particulate material application will also be referred to below as "coating" or "recoating".

"Selective liquid application" in the sense of the invention may be effected after each particulate material application or irregularly, depending on the requirements for the moulded article and for optimisation of the moulded article production, e.g. several times with respect to particulate material application. In this case, a sectional image of the desired article is printed.

The "device" used for carrying out the method according to the invention may be any known 3D-printing device which includes the required parts. Common components include coater, construction field, means for moving the construction field or other components in continuous processes, metering devices and heating and irradiating means and other components which are known to the person skilled in the art and will therefore not be described in detail herein.

The "absorber" in the sense of this invention is a medium which can be processed by an inkjet print head or any other device working in a matrix-like manner, which medium enhances the absorption of radiation for local heating of the construction material. The absorber may also be in the form of particles, e.g. black toner. Absorbers may be applied uniformly or selectively, in different amounts. For example, the absorber may be applied as a mixture of absorbers with different absorption maxima, or different absorbers may be applied independently, e.g. one after another, in an alternating manner or in a predetermined sequence. Thus, applying different amounts allows the strength in the construction material to be controlled and to selectively achieve different strengths, e.g. in the moulded part to be produced and the jacket surrounding it. The strength ranges from a strength as in the component itself to a strength that is only insignificantly above that of the construction material without the absorber printed thereon. This allows temperature control in the construction field/construction space and also allows easy removal, if desired, of the jacket surrounding the produced component, which jacket serves the purpose of temperature control.

"Absorption" refers to the uptake by the construction material of thermal energy from radiation. The absorption depends on the type of powder and the wavelength of the radiation.

The "support" refers to the medium in which the actual absorber is present. This may be oil, a solvent or generally a liquid.

"Radiation-induced heating" as used hereinafter means irradiation of the construction field by stationary or mobile sources of radiation. The absorber is adapted to the type of radiation and preferably optimised. This is intended to produce differences in heating between "activated" and "non-activated" powder. "Activated" means that, by the absorber printed therein, the temperature in these regions is increased as compared to the other regions in the construction space.

"Basic temperature" in the sense of the invention means the temperature which is adjusted in the construction space on the surface of the particulate material and in the printed particulate material by suitable means, e.g. an IR emitter. In this case, the basic temperature is selected so as to be suitable, with respect to the particulate material and in interaction with the absorber, to achieve selective solidification with positive material properties.

"IR heating" as used herein specifically means irradiation of the construction field by an IR emitter. The emitter may be either static or movable over the construction field by a displacement unit. Using the absorber, the IR heating results in different temperature increases in the construction field.

An "IR emitter" is a source of infrared radiation. Usually, incandescent filaments in quartz or ceramic housings are used to generate the radiation. Depending on the materials used, different wavelengths result for the radiation. In addition, the wavelength of this type of emitter also depends on the power output.

An "overhead lamp" in the sense of the invention is a source of radiation mounted above the construction field. It is stationary, but has an adjustable radiant flux.

The "sintering lamp" is a source of radiation which heats the process powder (particulate construction material) to above its sintering temperature. It may be stationary. In preferred embodiments, however, it is moved over the construction field.

"Sintering" or "melting" is the term for the partial coalescence of the particles in the powder. In this system, the build-up of strength is connected with the sintering.

The term "sintering window" refers to the difference in temperature between the melting point occurring when first heating the powder and the solidification point during the subsequent cooling.

The "sintering temperature" is the temperature at which the powder first begins to fuse and bond.

Below the "recrystallization temperature", powder once melted solidifies again and shrinks considerably.

"Recycling rate" refers to the ratio of the amount of particulate material that can be used for a new process cycle after completion of the construction process to the total amount of particulate material required for one process cycle. Particulate materials whose properties change due to the construction process, sometimes require the admixture of an amount of particulate material not used in the process. A typical example is polyamide 12, which is subject to irreversible thermal damage upon heating close to the melting point.

The "packing density" describes the filling of the geometric space by solid matter. It depends on the nature of the particulate material and the application device and is an important initial parameter for the sintering process.

The term "shrinkage" refers to the process of geometric shortening of a dimension of a geometric body as a result of a physical process. As an example, the sintering of suboptimally packed powders is a process resulting in shrinkage with respect to the initial volume. Shrinkage can have a direction assigned to it.

"Deformation" occurs if the body is subject to uneven shrinkage in a physical process. Such deformation may be either reversible or irreversible. Deformation is often related to the global geometry of the component.

"Curling" as used herein refers to an effect resulting from the layer-wise approach of the described invention. This means that layers generated in quick succession are subject to different degrees of shrinkage. Due to physical effects, the compound then deforms in a direction which does not coincide with the direction of shrinkage.

The "greyscale value" refers to the amount of absorber printed into the powder. According to the invention, different greyscale values can be printed onto the construction field in order to achieve different degrees of heating.

The construction material is always applied in a "defined layer" or "layer thickness", which is individually adjusted according to the construction material and the process conditions. It is, for example, 0.05 to 0.5 mm, preferably 0.1 to 0.3 mm.

"Temperature difference" refers to the difference in temperature in the construction field in areas which are or are not printed with absorber and, consequently, are intended to solidify or not. Another aim may be for some regions to solidify only partially or only to a very small extent and even, essentially, to not solidify at all, despite the absorber printed in, as is the case with preferred embodiments of the jacket. The temperature differential will vary accordingly.

"Temperature band" refers to the temperature range within which regions of the particulate material are heated and then cooled again during the layer construction process.

"Temperature control" refers to the adjustment of a desired temperature in the construction space, which may be kept constant or may be varied cyclically. Preferably, a basic temperature is set to a selected value.

"Jacket" in the sense of the invention is a region or layer which surrounds the moulded part and which, during the layer construction process, is heated up more than the powder disposed outside which is neither part of the jacket nor of the moulded part. The jacket allows the specific local control of the temperature in the process, especially in the desired moulded part. The jacket is characterised by having absorber printed in at least some parts thereof. Preferably, absorber is printed into the jacket in each layer or in regularly recurring layers. This jacket may be several millimetres thick and surrounds the moulded part to be manufactured over its entire circumference and as a whole. Alternatively, the jacket may consist of recurring rings (from the bottom to the top, in the direction of construction), which surround the moulded part and are characterised by having absorber printed into them. The jacket may have a strength which corresponds to that of the moulded part, but is preferably lower than that of the moulded part. In a preferred embodiment, the jacket only has a slightly higher strength than the construction material itself and thus has the advantage of being easily removable from the moulded part after the construction process.

Various aspects of the invention will be described below.

In one aspect, the invention relates to a method of producing 3D moulded parts, wherein particulate construction material is applied onto a construction field in a defined layer by means of a coater, one or more liquids or particulate material of one or more absorbers is/are selectively applied, this layer is heated in a first heating step to a basic temperature of the powder without the absorber, which is within the sintering window of the, e.g., polyamide powder, and heat input in a second sintering step leads to selective solidification of the areas printed with absorber, at a sintering temperature above the melting temperature of the powder, wherein the areas with the selectively applied absorber heat up more in the first step than the areas without absorber, and thus a temperature difference is set between areas with and without absorber, the construction field is lowered by one layer thickness, or the coater is raised by one layer thickness, these steps are repeated until the desired 3D moulded part is produced, wherein the heating step to said basic temperature is effected by an emitter with a wavelength of approximately 3-8 µm, preferably approximately 5 µm, and the sintering step is effected by an emitter with a wavelength of approximately 0.5-1.5 µm, preferably 0.9-1.1 µm, more preferably 1 µm.

With the method according to the invention, a particularly advantageous combination of different process conditions has been found, which leads to very advantageous process results in a surprising manner and allows the production of high-quality 3D moulded parts via the HSS process.

One aspect in this context is the precise selection and adjustment of the emitter wavelength range which, in combination with the other selected process parameters, achieves these process results. Thus, the wavelength is to be selected as describe above, said wavelength being the peak wavelength of blackbody radiation.

Use is made of an absorber which is suited to the other process conditions, said absorber preferably being a liquid, which is preferably an oil-based ink containing carbon particles. An example of a suitable ink is XAAR IK821.

The method according to the invention preferably uses a particulate construction material which has an average particle size of 50-60 µm, preferably 55 µm, a melting temperature of 180-190° C., preferably 186° C., and/or a recrystallization temperature of 140-150° C., preferably 145° C. Examples of such construction materials include polyamide 12, PA2200® or VESTOSINT 1115®.

The coating cycle is selected to match the other process parameters, and one complete coating cycle takes 20 to 40 s. A "complete coating cycle" is understood to be the operation during which the coater and the printing unit respectively move over the entire surface of the construction field.

The basic temperature is advantageously set to 145° C. to 186° C., preferably 160° C. to 180° C., and/or the sintering temperature is set to 175° C. to 220° C., preferably 190° C. to 210° C.

In a particularly preferred embodiment of the method according to the invention, the temperature or heat input, respectively, is achieved via an emitter or a thermolamp, preferably a glass or ceramic lamp, and the distance from the emitter to the construction field surface is preferably 10 to 50 cm, preferably 15 to 30 cm, more preferably 15 to 25 cm.

Surprisingly, using the above process parameters in the combination shown, very advantageous process results were achieved.

In an alternative embodiment, the invention relates to a method of producing 3D moulded parts, wherein particulate construction material is applied onto a construction field in a defined layer by means of a coater, one or more liquids or particulate material of one or more absorbers is/are selectively applied, this layer is heated, wherein the areas with the selectively applied absorber heat up more than the areas without absorber, and thus a temperature difference is set between areas with and without absorber, the construction field is lowered by one layer thickness, or the coater is raised by one layer thickness, these steps are repeated until the desired 3D moulded part is produced, and absorber is additionally printed around the 3D moulded part in order to produce at least one jacket.

An embodiment is particularly preferred wherein heating takes place such that only the areas printed with absorber connect by partial melting or sintering.

With the method according to the invention, the above-described problems or disadvantages are at least reduced or avoided completely.

In particular, the recycling rate of the construction material and, thus, cost-effectiveness, is increased. It also becomes possible to better adjust the temperature in the construction space and the individual regions of the construction material and to mitigate or fully eliminate problems such as curling.

The construction material may be present in any suitable form and with agents that can be applied by the device. The device used for the method may be adapted to the construction materials by suitable means and also constructionally, by known means. The construction material is preferably used in the form of a powder or dispersion.

The temperature in the construction space is set to a temperature which is advantageous for the method and is adapted to the construction material; this temperature may also be referred to as the basic temperature. After coating, the newly applied layer is preferably heated by radiation in a planar or sweeping manner such that it quickly reaches the basic temperature.

Preferably, the construction material on the construction field or in the job box, respectively, may also be temperature-controlled.

Generally, absorbers known from HSS processes may be used, preferably using different absorbers in the 3D moulded part and in the jacket, or preferably using the same absorber in both.

The absorber may be applied to all selective regions either in the same amount or in different amounts. Preferably, less absorber is applied in the jacket area. Further, the application of absorber in the jacket area may be selected so as to adjust the strength of the jacket, on the one hand, and influence the temperature by the introduction of absorber into the jacket and by selection of the jacket thickness, on the other hand.

Preferably, the same absorber or a different absorber is used for the jacket as for the moulded part.

The absorber is selected and dosed according to the desired properties and effects in the method. Preferably, the absorber used for the jacket prevents sintering of the construction material.

The selectively printed liquid may be the absorber itself or may contain or comprise the absorber as well as additional substances. The absorber preferably comprises radiation-absorbing components, plasticizers for the particulate construction material. If polyamide or a similar material is used as the particulate material, the absorber may additionally include one or more substances interfering with recrystallization.

In a preferred aspect of the method one source of radiation is used for each absorber, preferably using two absorbers with two sources of radiation.

Any suitable means may be used as the source of radiation or heat, said sources of radiation preferably emitting infrared radiation in the wavelength range from 1 to 20 μm.

In another preferred embodiment of the method, the jacket is constructed with a wall thickness of 1 to 10 mm, preferably 2 to 5 mm and more preferably 3 mm. The process may cause the jacket to solidify or not. Preferably, the process does not cause the jacket to solidify.

An important aspect of the invention is the temperature control in the process, in particular in the areas where absorber is applied and in the areas having no absorber applied thereon. In this context, the temperatures, temperature differences, and cyclisation of the temperature are adapted to each construction material and to the absorber used, so as to obtain the desired moulded parts and achieve the advantageous effects of the method according to the invention.

Figure 6:
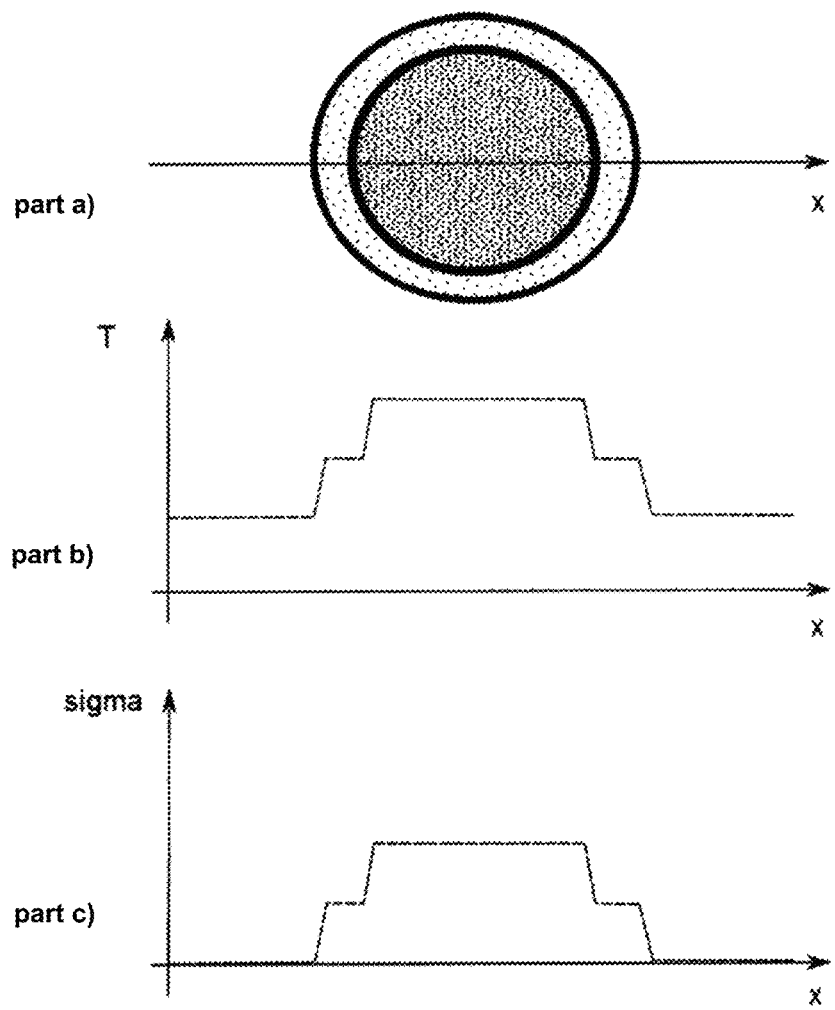
FIG. 6 is an illustrative drawing showing a temperature profile of an applied construction material including a jacket.

The following approach may be taken. Preferably, the same temperature or locally different temperatures are set or generated in the applied construction material. Preferably, a temperature is set in the jacket that is below the sintering temperature of the construction material in this area. It is also possible to adjust or achieve a specific temperature profile, by forming and placing the jacket accordingly. Preferably, a temperature profile is generated, in the applied construction material, that is characterised by a temperature distribution of low:higher:still higher ($T1<T2<T3$) in the following areas: area outside the jacket:jacket area:area within the jacket (jacket<jacket area<area within the jacket) according to FIG. 6.

On the other hand, the temperature achieved in the construction field is controlled directly by the energy input, with the jacket influencing the local temperature adjustment. Advantageously, heat or energy input may be performed in a uniform or locally differing manner across the construction field.

As shown, the temperature adjustment can be controlled by the construction of the jacket and is controllable by the introduction of the absorber. Preferably, an absorber is used for the jacket which has a higher boiling point than the absorber used for the 3D moulded part. The amount of the absorber or absorbers is preferably controlled via greyscale values of the print head or via dithering methods.

Known print heads with suitable technology are used to apply the liquid and the absorber. The liquid may be selectively applied by means of one or more print heads. Preferably, the print head or print heads are adjustable in terms of drop mass. The print head or print heads may selectively apply the liquid in one or both directions of movement. The method achieves that the particulate construction material is selectively solidified, preferably selectively solidified and sintered.

In the construction process, the construction material and the absorber are cyclically applied. For this purpose, the construction field is lowered by the desired layer thickness or the application units are raised correspondingly. These operations are cyclically repeated. In a corresponding manner, the basic temperature in the construction material is also adjusted, and then the temperature is cyclically increased within a temperature band above the basic temperature in selected areas and decreased again. The temperature band is determined by the material. Depending on the selection of the construction material, the temperature band preferably extends within a range from 0 to −50 K, 0 to −30 K, 0 to −20 K and 0 to 10 K, from the melting point of the construction material.

The different areas on the construction field are adjusted to corresponding temperatures. Preferably, the temperature difference between areas with and without absorber is within a range of from 0.5 to 30 K.

Further, in the method according to the invention, that temperature range is of importance which is adjusted in the area printed with absorber and in the other areas. Preferably, the temperature in the area printed with absorber or in the area within the jacket is set within a temperature range from 0 to −30 K, preferably 0 to −25 K, more preferably 0 to −15 K, with respect to the melting point of the construction material.

In a preferred embodiment, the absorber and the temperature are selected such that the jacket can be easily removed by powder blasting or by means of an air jet after the construction process.

Another aspect of the invention is the 3D moulded part produced by the method according to the invention. The moulded part preferably has a jacket surrounding it substantially along its entire circumference, said jacket having been constructed using an absorber and there being unsolidified particulate construction material between the 3D moulded part and the jacket. Different strengths may be adjusted in the moulded part. The jacket preferably has a strength which is lower, substantially the same as or higher than that of the component.

Alternatively, the 3D moulded part is manufactured using an absorber, said 3D moulded part being surrounded, substantially along its entire circumference, by a jacket, said jacket having been constructed using an absorber, and said jacket being easily removable after the construction process by powder blasting or an air jet. In doing so, the jacket may be built laterally around the 3D moulded part and upwards during the construction process. This happens simultaneously with the construction of the 3D moulded part.

Another aspect of the invention is a device which is suitable to carry out a method according to the invention. Preferably, the device is temperature-controllable and preferably comprises an insulation (506) on the construction platform (102) downwardly and/or preferably laterally. Moreover, the device may comprise a resistance heating (504). The construction platform (102) may be arranged directly in the device or may be part of a job box or of a construction container. The device is preferably characterised by a construction platform (102) in a construction container (110), said construction container (110) preferably being temperature-controllable.

Various thermolamps, irradiation devices etc. may be part of the device. The device preferably comprises a heating means disposed above the construction platform, preferably an overhead lamp (108). Preferably, the device comprises a mobile heating means, preferably a sintering lamp (109).

In a further aspect, which can be combined with the above-described aspects and features in whatever way, the sintering operation or the bonding of the particulate material, which has been selectively printed with absorber, is even further improved in that the temperature control or the energy input, respectively, occurs in a differentiated manner, allowing to obtain a component with improved properties.

In this further aspect, the disclosure relates to a 3D printing method as well as a device suitable for said method, which is preferably carried out as an HSS process and is characterised in that two sintering lamps with different wavelength spectra or energy inputs are used, preferably two sintering lamps or one sintering lamp whose spectrum is characterised by being composed of two different blackbody radiation spectra, or is characterised by having a spectrum which differs from the blackbody radiation spectrum. Thus, a device and a method are disclosed, wherein the temperature adjustment of the particulate material and of the regions which are to solidify in the particulate material is effected by at least two emitters (sintering lamps) or one emitter with different wavelengths and/or energy input.

In a preferred aspect, at least two sintering lamps covering a different radiation spectrum are used for this purpose in the device. This allows a further differentiated adjustment of the process conditions. An advantageous result thereof is that a temperature is reached for the unprinted and absorber-free powder that is not too high and thus substantially prevents undesired adhesion of said material, while on the other hand allowing to achieve an optimised melting temperature in the region of the particulate material which contains absorber.

Preferably, two sintering lamps are used, which are preferably controllable independently of each other and can be moved independently over the construction field. For each sintering lamp, a wavelength spectrum or wavelength, respectively, adapted to the respective particulate material and the binder to be imprinted is selected and adapted to the other process parameters, such as traversing speed, basic temperature, and particle layer thickness. Also, each sintering lamp may be used with a pre-selected level, such as, e.g., 50, 60, 70, 80, or 90% of its maximum power. A typical traversing speed of the sintering lamps is in the range of 90 to 150 mm/s, preferably 100 to 120 mm/s. The at least two, preferably two, sintering lamps are preferably coupled with the coater or arranged independently thereof on their own axles. The two sintering lamps have different wavelengths and are moved across the construction field substantially simultaneously, preferably in an alternating manner or one after the other. Thus, the powder bed with the particulate material applied thereon is heated or its temperature is thereby adjusted as are the areas printed with absorber. However, more radiation is absorbed in the areas printed with absorber, allowing a more optimal adjustment of the melting temperature in the areas to be solidified, which has a positive effect on the component's properties, in particular in terms of strength. On the other hand, in the areas not printed with absorber, the temperature substantially remains below the melting temperature, thereby avoiding a solidification which would make unpacking more difficult. Partial melting is thus substantially avoided.

As the sintering lamp, two infrared halogen emitters are preferably used, which differ slightly in their generated wavelengths, though. Preferably, the second emitter is simply arranged behind the first emitter. There is no need for both emitters to be simultaneously activated every time, but they may also alternate, e.g. emitter 1 when traversing from left to right, then emitter 2 from right to left, etc.

In a preferred embodiment, a thermolamp may be structured in such a manner that it includes both the emitters for adjustment of the basic temperature in the construction space and the emitters required for the solidification process, wherein the latter may again cover at least two different wavelengths or wavelength ranges.

In a preferred embodiment (FIG. 9), the recoater axle (coater) includes a second radiation emitter (509) with a reflector (510) to the right of the first emitter (507). The second emitter is characterised in that its radiation spectrum differs from that of the first emitter. This may be achieved, for example, in that an emitter with a power of 1 kW and a length of 350 mm has a near-infrared spectrum with a peak wavelength of 1 µm, while the second emitter with a power of 1 kW and a length of 350 mm has a medium-wavelength spectrum with a peak wavelength of 2 µm. This allows separate control of the heating rates of wetted (107) and unwetted powder (103)—i.e. particulate material selectively printed with absorber—during the traversing movement of the recoater axle, because the particulate material used preferably absorbs radiation in the longer wavelength infrared range, while wetted powder preferably absorbs radiation in the shorter wavelength range. Control of both heating rates is also possible by varying the traversing speed and the emitter power. In a further aspect, the travel speed of the recoater axle (101) may be adjusted in addition so as to further regulate and fine-tune the energy input. Thus, selective control of the emitted spectrum advantageously results in particulate material not printed with absorber being easier to remove from the component. This reduces or even entirely prevents partial melting of particulate material not printed with absorber. At the same time, it is ensured that the areas printed with absorber receive sufficient energy input in order to achieve melting or solidification, respectively, of the particulate material with good component properties. Preferably, the traversing speed of the recoater axle can also be adjusted in addition so as to regulate the energy input.

Further preferably, a combination of two emitters having a short wavelength spectrum, a peak wavelength of 1.2 µm and a medium wavelength spectrum of 2 µm is possible, wherein one respective emitter is preferably deactivated, depending on the direction in which the recoater axle passes over the powder bed. Thus, the sintering pass is carried out with both emitters activated, while the return movement with application of the next layer of particulate material is carried out with the short wavelength emitter deactivated. A higher energy efficiency as well as a higher sintering pass speed are thus achievable in an advantageous manner.

Figure 10:
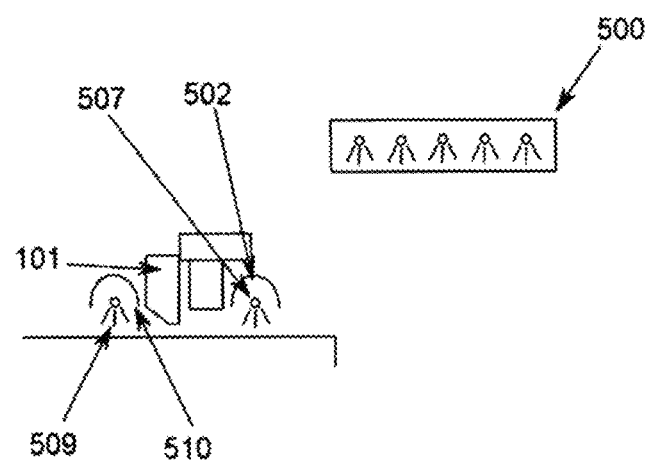
FIG. 10 is a drawing showing an illustrative arrangement of an overhead lamp and pair of radiation emitters.
Figure 11:
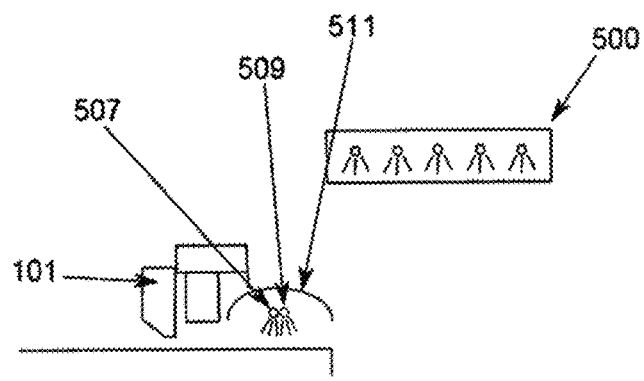
FIG. 11 is a drawing showing an illustrative arrangement of an overhead and a single radiation emitter.

Preferably, the axle systems are constructed in a design that is as narrow as possible so as to keep shading effects of the powder surface by the overhead heating elements (thermolamp) to a minimum. This also prevents or at least reduces cooling. In a preferred embodiment, both emitter types can be accommodated within one single quartz glass bulb (FIG. 11). Mounting laterally of the coater unit is also possible so as to be able to compensate for shading effects (FIG. 10).

The use of emitters of different spectra in the overhead heating element (500) enables reduced power levels of the emitters on the coater or print head unit, respectively, and thus offers the advantage of reduced heat development on the respective units, which consequently have to be cooled to a reduced extent.

Figure 12:
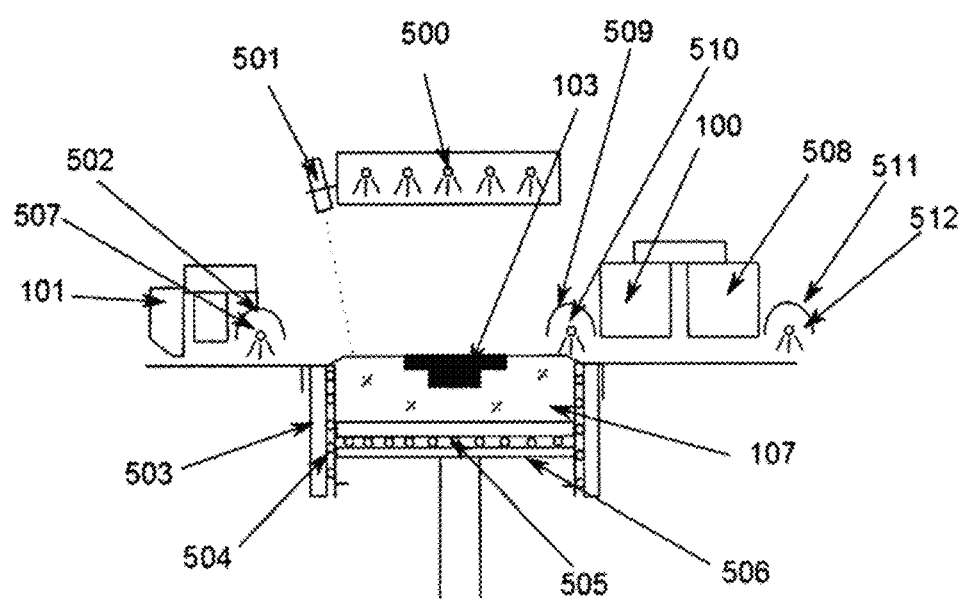
FIG. 12 is a drawing showing of an illustrative construction including an emitter attached to a print head axle.

Another preferred embodiment may consist in that one, preferably two emitters with different radiation spectra are additionally attached to the print head axle (FIG. 12). This has the advantage that, when the powder surface is sufficiently shielded, e.g. by a metal roller cover spanning the powder bed, the overhead heating system can be dispensed with completely. Not only does this allow the power consumption of this assembly to be reduced, but the pass of both axle systems also allows the powder surface to be adjusted to a more uniform temperature, which benefits the strength and dimensional stability of the components produced by the method.

Figure 13:
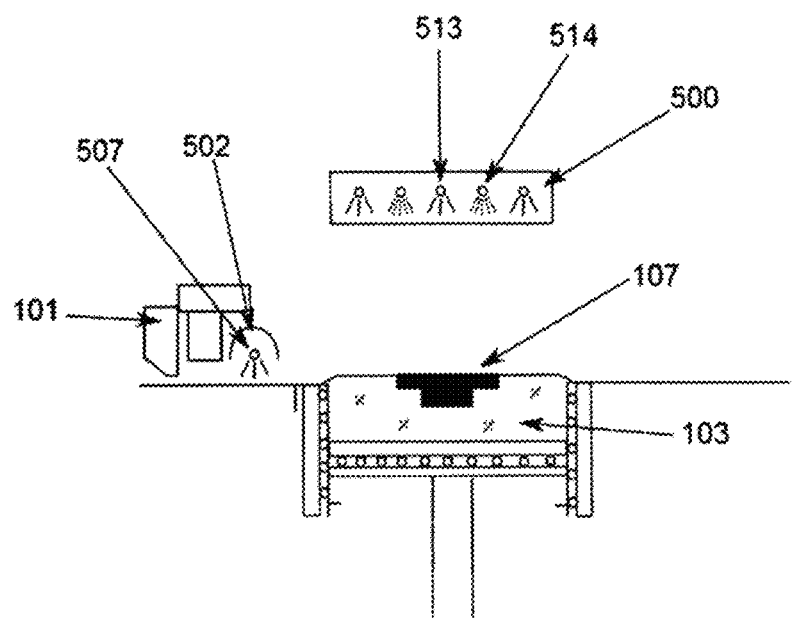
FIG. 13 is a drawing showing an illustrative construction including an overhead lame having emitters of different wavelengths.

In a further preferred embodiment, emitters of different wavelengths may also be attached to the overhead heating system (FIG. 13). Thus, advantageously, emitters on the axle systems can be dispensed with altogether, so that their traversing speed can be maximised due to the now lower mass and smaller dimensions. Moreover, this advantageously shortens the shading of the powder surface by the overhead heating elements, which prevents cooling of the surface. The construction in this preferred embodiment is characterised in that ceramic heating elements are used on the overhead heating system in order to produce the basic temperature of the powder surface, while after selective printing/wetting of the powder surface with absorber by the print head, near infrared emitters in the overhead heating system are, however, activated in addition for a defined time of preferably 8 s and homogeneously illuminate the powder surface. This then results in melting of the particulate material of the wetted surface.

In a preferred embodiment, the disclosure relates to a device suitable for carrying out a method as described above. For this purpose, all of the above-described features can be combined in whatever manner. A device is preferred which is characterised by comprising the following features: a heating element (507) which is arranged on the oscillating blade recoater (101) and has a peak wavelength 0.3 µm to 3 µm, preferably 0.7 µm to 2.5 µm, particularly preferably 0.9 µm to 1.4 µm; preferably a reflector (502); a further heating element (509), preferably with a reflector (510), which preferably has a radiation spectrum differing from that of heating element (507), of 1 µm to 3 µm, preferably 1.5 µm to 2.5 µm, particularly preferably 1.7 µm to 2.2 µm, and/or is operated simultaneously with the heating element (507) at a different power of 200 W to 2 kW, preferably 350 W to 1.5 kW, particularly preferably 400 W to 700 W, and/or is arranged next to the first heating element on the side facing the construction space, and/or is located laterally next to the oscillating blade, on the side facing away from the construction space, and/or is located, together with the first heating element, below a common reflector (511), and/or is incorporated into the quartz glass bulb of the first heating element, and/or
another heating element (510) with a reflector (509), located on the left-hand side of the print head unit (100) facing the construction space, and/or another heating element (512) with reflector (511) on the right-hand side of the print head unit (508) facing away from the construction space.

Another preferred embodiment is a device comprising a further heating element (514) with a spectrum differing from the first heating element (513), said further heating element (514) being arranged on the overhead lamp (108) with a peak wavelength of 0.3 µm to 3 µm, preferably 0.7 µm to 2.5 µm, particularly preferably 0.9 µm to 1.4 µm.

The advantage of using two emitters with different radiation spectra resides in controlling the temperature of the unwetted surface of the coating (107) independently of the temperature of the wetted powder surface (103) (areas selectively printed with absorber). The inventive idea is evident, among others, from FIG. 9 in a preferred embodiment. It shows the use of an infrared halogen emitter (507) for the irradiation pass, whose beam direction is directed onto the powder surface (107) by means of a reflector (502), on which powder surface (107) the previously applied layer (103) to be irradiated is located, and now a second emitter (509) with a reflector (510) is used which differs from the emitted spectrum of the first emitter (507), however.

Below, still further preferred variations of the disclosure are shown:

1) Two emitters with different spectra. Embodiment examples:
   Emitter 1 with medium wavelength spectrum (peak wavelength 1.6 µm), emitter 2 with near-infrared spectrum (peak wavelength 0.98 µm).
   Emitter 1 with medium wavelength spectrum (peak wavelength 1.6 µm), emitter 2 with short wavelength spectrum (peak wavelength 1.2 µm).
   Emitter 1 with medium wavelength spectrum (peak wavelength 1.6 µm), emitter 2 with long wavelength spectrum (peak wavelength 4.6 µm).
   Emitter 1 with long wavelength spectrum (peak wavelength 4.6 µm), emitter 2 with near-infrared spectrum (peak wavelength 0.98 µm).
   Emitter 1 with long wavelength spectrum (peak wavelength 4.6 µm), emitter 2 with short wavelength spectrum (peak wavelength 1.2 µm).
   Emitter 1 with short wavelength spectrum (peak wavelength 1.2 µm), emitter 2 with near-infrared spectrum (peak wavelength 0.98 µm).
2) Like 1) but both emitters inverted
3) Like 1) but one emitter spectrum partly in the UV range
4) Like 1), wherein one emitter is a ceramic emitter or a quartz emitter
5) Two identical emitters, wherein one emitter is operated at a lower power, so that its spectrum shifts towards greater wavelengths.
6) Two emitters with any spectrum according to 1), by whose power supply the spectrum is respectively adapted.

As described above, the disclosed method may be varied by variations in the time sequence of individual process steps, thereby achieving advantageous process results:

1) Both emitters are activated during the pass over the powder surface (103)
2) Only one emitter, either (507) or (509), as selected, is activated, while the other emitter is deactivated during the pass, during which exposure takes place, from left to right in the example of FIG. 10.
3) Like 2), but during the coating pass from right to left in the example of FIG. 10.
4) Like 2), but with respect to the direction of movement, the respective other emitter is activated.
5) Like 2), but during the pass, both emitters are deactivated In an alternative embodiment, the object underlying the application may also be attained in that the temperature fine adjustment or temperature optimisation, respectively, is achieved by using printing fluids with an advantageous absorption spectrum, so that particulate material wetted with them can be heated to an optimised degree, if possible, by means of a defined infrared emitter spectrum. Different printing fluids (absorbers) can be selectively printed in the process, thus achieving improved and/or optimised heating and solidification of the component as well as component properties.

The printing fluid (absorber) is advantageously adapted to the emitters and, in this case, the method can be carried out using an overhead emitter and a sintering emitter. One, two, or three different printing fluids may be applied simultaneously, successively, in an alternating manner, selectively as a mixture. The printing fluid or the printing fluid mixture may have an absorption maximum, for example, between 750 and 900 nm, preferably from 780 to 850 nm, more preferably 815 nm. Each printing fluid may have a different one of the above-mentioned absorption maxima.

Further aspects of the disclosure will be described below.

As described, one object, i.e. preventing or effectively reducing powder aging, is preferably achieved by imprinting absorbers outside the geometric area of the actual component. This measure allows the amount of powder subject to high temperatures to be reduced.

The aging of the powder is a chemical process which, according to the literature, includes different mechanisms. For instance, the following subprocesses can be found for polyamide 12: Firstly, the oxygen in the air has an oxidative effect and modifies the base material. Reactive groups are bound thereby and strength cannot fully develop. Secondly, the chains of the base polymer grow. This increases the melting viscosity and processing cannot be performed in the same manner as with a new powder. A third effect is considered to be a certain reduction in reactive terminal groups. This occurs as a result of the mutual reaction of polymer chains with one another. It is particularly important for interlaminar bonding.

The common trait of all these effects is their chemical nature. This makes them considerably temperature-dependent. In this case, an increase by 10° C. may even double the reaction rate. Therefore, it is easy to understand that a temperature decrease during the process by a few degrees will have a massive effect on powder aging.

The prior art method consists of the steps of layering, printing, exposure to radiation and lowering. The first step is analogous to the layering in known powder-based 3D printing. Powder is placed in front of a blade, applied onto a construction platform and smoothened by the blade. In this case, the layer thickness determines the positions of the construction platform in two successive coating operations.

Next, the layer is printed. In the method mentioned here, liquids are applied by an inkjet print head. Part of the liquid is an absorber which causes local heating of the powder upon exposure to radiation. Alternatively, the absorber may also be a powder, preferably a carbon toner, which is selectively applied in a suitable manner.

The layer thus printed is then scanned by a radiation source and thereby selectively heated. In the process, the entire powder is heated by the source of radiation. However, the temperature increases particularly in activated areas such that the particles begin to sinter and thereby bond.

After this step, the construction field is lowered by one layer thickness. Then, all the above-mentioned steps are repeated until the desired component is obtained.

In addition to the source of radiation scanning the construction field, an additional, stationary source of radiation is preferably present above the construction field. The additional source of radiation acts whenever the construction field is not covered by a unit, such as the coater or the print head. This overhead lamp, as it is called, is preferably controlled so as to set a constant temperature on the construction field. For example, a pyrometer sensor may be used to determine the actual temperature. In such an arrangement, the overhead lamp constitutes the central temperature control component.

The construction field is maintained at a temperature near the sintering temperature. On the one hand, the additional energy for sintering the powder is then low and can be introduced by gently acting means. On the other hand, the temperature surrounding the component is so high that the temperature does not drop below the recrystallization temperature, even in the peripheral areas of the component, as the construction process progresses and, consequently, does not disrupt layering.

In contrast to laser sintering, keeping the powder near the sintering temperature is not a stringent condition in the HSS process. The source of radiation in combination with the absorber allows a large amount of energy to be introduced selectively. Therefore, this process only requires the powder surrounding the component to be kept at a temperature near the sintering temperature in order to prevent the component cooling too quickly after the energy input.

According to the invention, this effect may also be produced by imprinting absorber outside the component. This generates an area which, on the one hand, is heated to near the sintering temperature and, on the other hand, is controlled to have a temperature low enough to prevent the powder from sintering in this area.

With respect to the energies and coating times used, this process requires low thermal conductivities and high thermal capacities. This ensures that the area outside the component does not cool too quickly. Many polymers used in the field of sintering meet the above-mentioned requirements.

In the prior art method, the entire powder is heated to a temperature near the sintering temperature. The energy exchange with the unprinted area is driven by the temperature difference of few degrees Celsius. Thus, cooling takes place at a time when many layers have already been built on top of each other in the powder bed.

The method according to the invention can be carried out with the same kind of sintering at a much lower temperature. The parameters are the relative amount of absorber and the width of the "jacket" around the component. Temperature control is effected by the controlled overhead lamp.

On the one hand, the input amount can be adjusted via the printing resolution. The latter may be adjusted, e.g. by multiple passes, if only one absorber and one print head are used. In this case, e.g., the cross-section of the component is printed in a first step. In the second pass, the jacket can be printed with an adapted resolution. This method requires two passes and is therefore suboptimal in terms of process speed.

It is also possible for both print jobs to be performed in one pass. A particularly simple method consists in weakening the printed images in the area of the jacket by what is called dithering. In this case, various mathematical algorithms may be used to distribute the printed dots such that the thermal effect in the jacket achieves the desired level. A technically more complex method is the use of greyscale inkjet print heads. It allows a selectable adjustment of the drop mass during printing.

Particularly favourable properties can also be achieved by separately applying an absorber which differs from the absorber in the component. This generally requires the use of a second print head.

The second print head can be moved along with the first one. There may also be different modules incorporated in one print head. Depending on the chemical composition, there need to be means for separating the two liquids from each other. This applies, in particular, to the print head cleaning operation.

The use of the second liquid medium allows particularly precise adjustment of the effect. This applies, on the one hand, to the thermal effect. For example, the required amount of heat input can be influenced by the relative amount of absorber. This may have technical advantages with respect to resolution and relative drop mass.

Also, specific changes in sintering behaviour may occur in the peripheral area. For example, a separating agent may be introduced which considerably delays sintering. This avoids adhesion to the component and, consequently, facilitates unpacking of the components.

This effect can be enhanced even to the extent that the temperature of the jacket is above that of the component. As a result, additional sintering can be achieved in the peripheral area of the actual component. Deformation by cooling can thus be prevented even better.

The device required in order to carry out the invention is closely modelled on a 3D printer for powder-based printing. In addition, further process units are used for temperature control and imprinting of the process liquids.

At the beginning of the process, the entire device is heated up. For this purpose, all heating elements are used to increase the temperature. The heating phase is complete as soon as the temperature remains constant in all measurement locations of the system.

The individual heating systems of a preferred embodiment of the invention will be described below:

The construction platform (102), on which the powder is deposited in the process and by which the layer thickness of the layers (107) is adjusted, can be heated by various systems. A preferred embodiment uses an electric resistance heating (504). Also preferably, the latter is provided as a planar heating film, based on considerations of a homogeneous heating effect. The effect of this heating is registered and controlled by a sensor. The sensor is connected directly with the construction platform. Conveniently, the construction platform itself is made of metal, preferably aluminium. An insulation (506) covers the construction platform (102) downwardly.

The construction platform may also be heated by a fluid. For this purpose, heating coils (504) are installed below the preferably metallic construction platform. Further below, an insulation (506) is disposed in order to homogenise the heating effect.

A heat transfer oil, for example, flows through the heating coils. Preselecting the oil temperature allows exact temperature adjustment. Very precise temperature control can be achieved by ensuring a sufficiently high flow rate and adjusting the power.

The construction platform (102) is moved in the construction container (110) as it is called. The container may be designed to be removable from the 3D printing device. In this manner, a great temporal machine efficiency can be achieved, as a second construction container can be used in the device while unpacking the components.

The construction container (110) is also heated. For this purpose, the same techniques can be used as for the construction platform. The container itself is preferably made of metal again, preferably of aluminium to ensure good heat conduction. The actual active heating (504) is in turn backed by an insulation (503). This allows the effect to be enhanced, while increasing homogeneity.

A plug-in system is preferably arranged between the device and the construction container for power connection. This may include an electrical connection or a connector for liquids.

The next essential heating system of a device according to the invention is the overhead lamp (108). According to the invention, the overhead lamp (108) is preferably disposed above the construction field and irradiates the construction field perpendicularly. Also preferred are laterally mounted emitters which irradiate the construction field at a certain angle. Such a construction is preferred in order to minimise the shading effect of the coater or the print head.

The overhead lamp (108) is preferably equipped with infrared emitters (500). The latter may be quartz glass lamps or ceramic emitters. The selection depends on the absorber selected and the combination which is best, considering the nature of the process, and fits the wavelength.

It is favourable for the method to operate the overhead lamp (108) in a controlled manner. For this purpose, the use of a pyrometer (501) as the sensor may be preferred. The pyrometer is directed towards an peripheral area of the construction field, which the control system ensures is not a region printed with absorber.

In a preferred embodiment of the invention, the actual sintering is carried out by an infrared lamp (109) carried along with the coater. Said lamp heats the construction field as it passes over the latter. The lamp may be used to heat the freshly printed powder or an already covered powder layer. Due to the necessary temperature dynamics, a quartz emitter is preferably used here.

In a preferred embodiment of the device, the powder is preheated before application onto the already existing powder surface so as to prevent excessive cooling of the layer. An electric resistance heating in the coater is also suitable to preheat the powder.

In principle, all units can also be heated indirectly via infrared radiation. Particularly preferably, the coater is heated by radiation if strong vibrations occur.

Preferably, the following sequence of process steps is carried out by the device after the heating phase: A powder layer is formed by the coater (101) on the construction platform (FIG. 1, part a). Optionally, depending on the design of the machine, the new layer can be additionally heated by the sintering lamp (109). Next, this layer is printed on by one (100) or several inkjet print heads (100 and 508) (FIG. 1, part b). Then, the construction platform (102) is lowered (FIG. 1, part d). Now, the printed layer is heated by the sintering lamp (109) and then covered with powder again.

This operation is repeated until completion of the components (103) in the construction container (110). Then the cooling phase follows. This phase preferably takes place in the construction container which is then supplied with energy outside the device.

Figure 2:
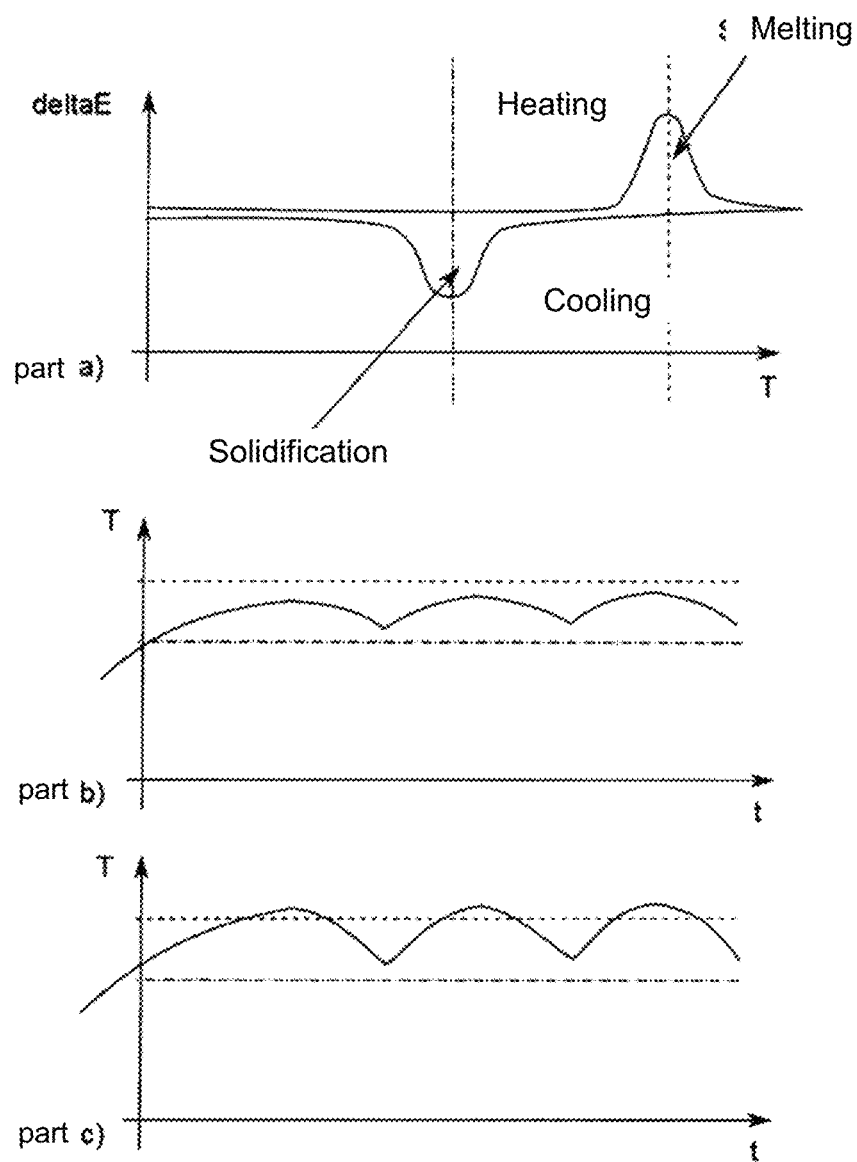
FIG. 2 is a drawing showing illustrative temperature diagrams with respect to melting and solidification temperatures.
Figure 3:
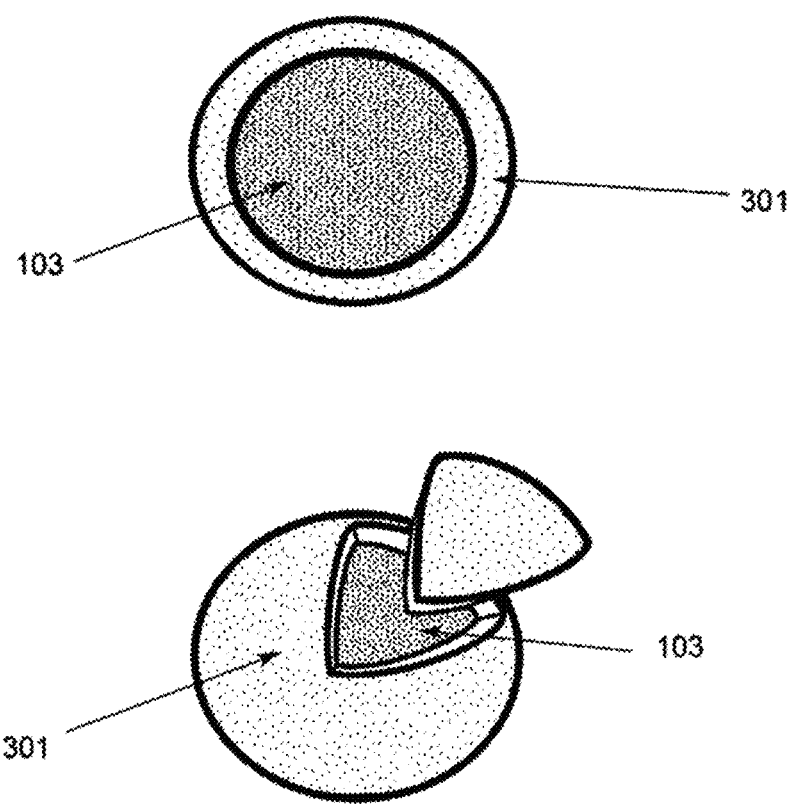
FIG. 3 is a drawing showing an illustrative component and jacket.
Figure 4:
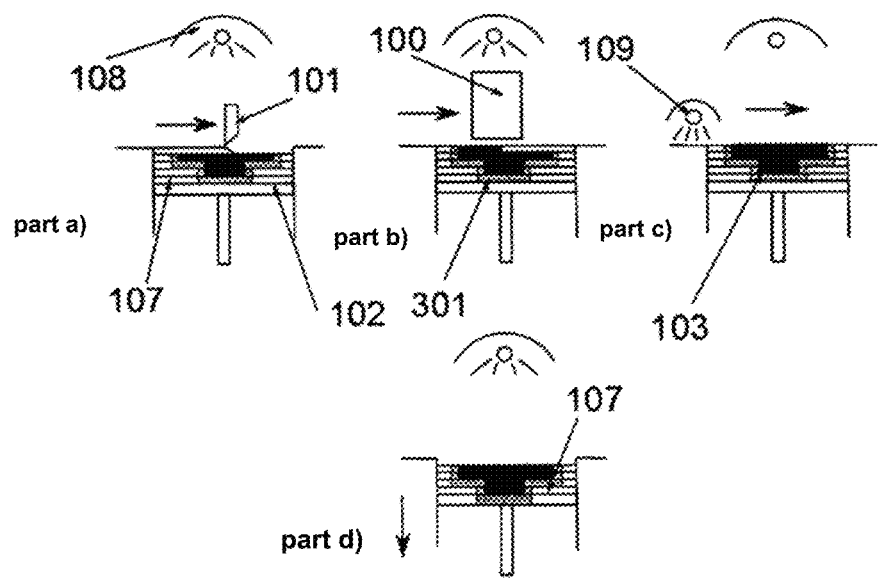
FIG. 4 is a drawing showing an illustrative sequence of process steps which may be employed for building a component and jacket.
Figure 5:
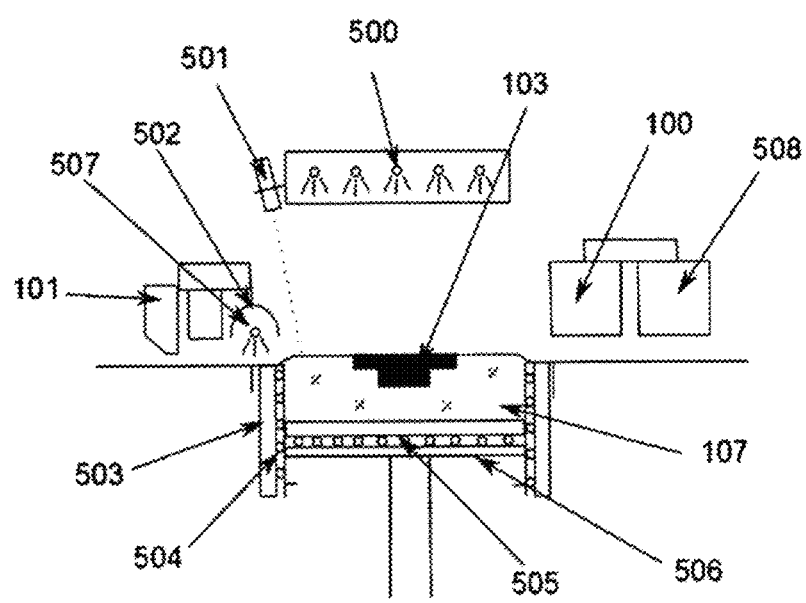
FIG. 5 is an illustrative drawing showing assembly parts which may be employed for a construction.

FIG. 2 presents temperature diagrams. FIG. 2, part a schematically shows the profile of the energy emitted by the powder when it is heated and cooled again in one cycle. During heating, significant absorption of energy occurs at a certain temperature. This is where the material melts or sinters (sintering temperature). For polyamide 12, which is suitable for laser sintering, this temperature is approx. 185° C. During cooling, there is also a significant point considerably below the sintering temperature (recrystallization temperature). This is where the molten material solidifies.

FIG. 2, parts b and c show the temperature profile during a process run according to a prior art method. FIG. 2, part b shows the temperature profile on the unprinted surface. Using the sintering radiation source produces heating and cooling phases in the otherwise constant profile. In the unprinted area, the temperature never reaches the sintering temperature.

FIG. 2, part c shows the profile in the printed area. Here, the variations are more marked. The process is controlled at least such that the sintering temperature is briefly exceeded, so that part of the powder is melted and remains molten. Excessive heating may cause all of the powder to melt in this area, resulting in massive warping. Excessive cooling of the printed area must also be avoided, because otherwise recrystallization will start, and then all shrinkages due to the now possible power transmission will lead to geometric warping (curling), which may make the further process impossible.

Figure 8:
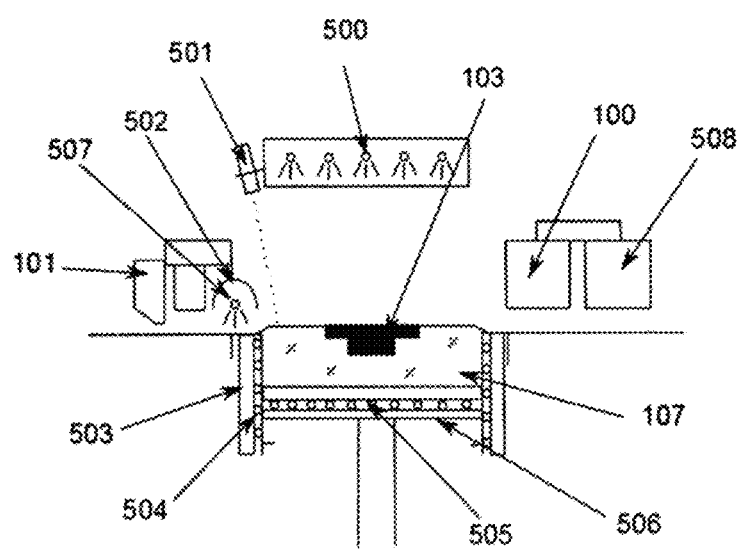
FIG. 8 is an illustrative drawing showing assembly parts which may be employed for a construction.

FIG. 8 describes an advantageous combination of assembly parts by which the advantageous process conditions according to the invention can be achieved. Further details thereof are illustrated in embodiment example 4.

The further Figures show the aspect of at least two sintering lamps or of at least two emitter types in one sintering lamp or thermolamp.

Figure 9:
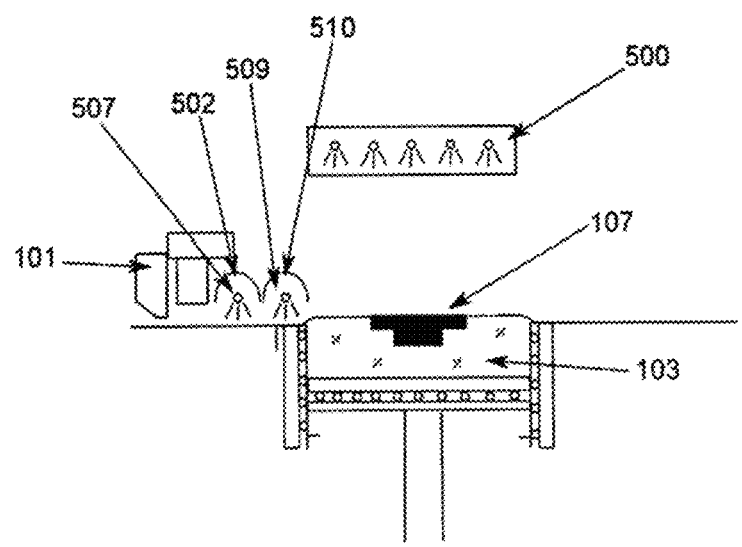
FIG. 9 is an illustrative drawing of a device for producing 3D parts including an overhead heating element and a radiation emitter.

FIG. 9 shows a construction, wherein in addition to the heating element (507) with reflector (502) another heating element (509) with reflector (510) having a different radiation spectrum is used.

FIG. 10 shows a second variant of the construction, wherein the second heating element is arranged on the left, next to the oscillating blade.

FIG. 11 shows a construction, wherein both heating elements having different spectra are mounted together, preferably inside a quartz glass bulb.

FIG. 12 shows a construction wherein further heating elements, optionally having different peak wavelengths, are mounted on the print head axle system.

FIG. 13 shows a construction, wherein the overhead-heating unit comprises an additional type of emitter whose emitted spectrum differs from that of the first one.

EXAMPLES

Example 1: Device Comprising an Inkjet Print Head with a Binary Droplet Size

The injket print heads common in 3D printing deposit one droplet on a dot in the raster of the print area. The size of said droplet is adjusted once.

During printing, in the method according to the invention, a respective cross-sectional image of the desired components (103) is printed using absorber, said image being adapted to the construction height. In this case, the image is printed in an intensity ensuring definite sintering of the particles during the pass of the sintering lamp. As described above, unprinted areas will remain unsintered. The necessary amount of liquid imprinted per raster dot in this case will be considered black in the following.

In the process, a jacket (301) is printed around the component, said jacket (301) representing a greyscale value, i.e. containing less absorber based on the local average. As preferred according to the invention, the jacket (301) is determined from the raw data during layer calculation. In this case, e.g. for the .stl file format, the jacket area is generated by an offset of the triangular areas.

The greyscale value can be achieved in the raster area by mathematical methods. For this purpose, the coverage of the jacket area with printed dots is controlled such that the desired greyscale value is achieved on average in a certain local viewing area. An example of such a mathematical method is the so-called error diffusion method. In this case, an area is used for averaging, and the corresponding raster dots are placed as a function of the greyscale value. In a simple example, in order to achieve a greyscale value of 30% in an area of 10 by 10 dots, 30 dots must be printed "black" and 70 dots remain unprinted.

Using this method, a conventional print head (100) will suffice. The device does not differ from the prior art devices. Also, the same data paths can be achieved, because the information can be stored in one single monochromatic raster bitmap.

Figure 7:
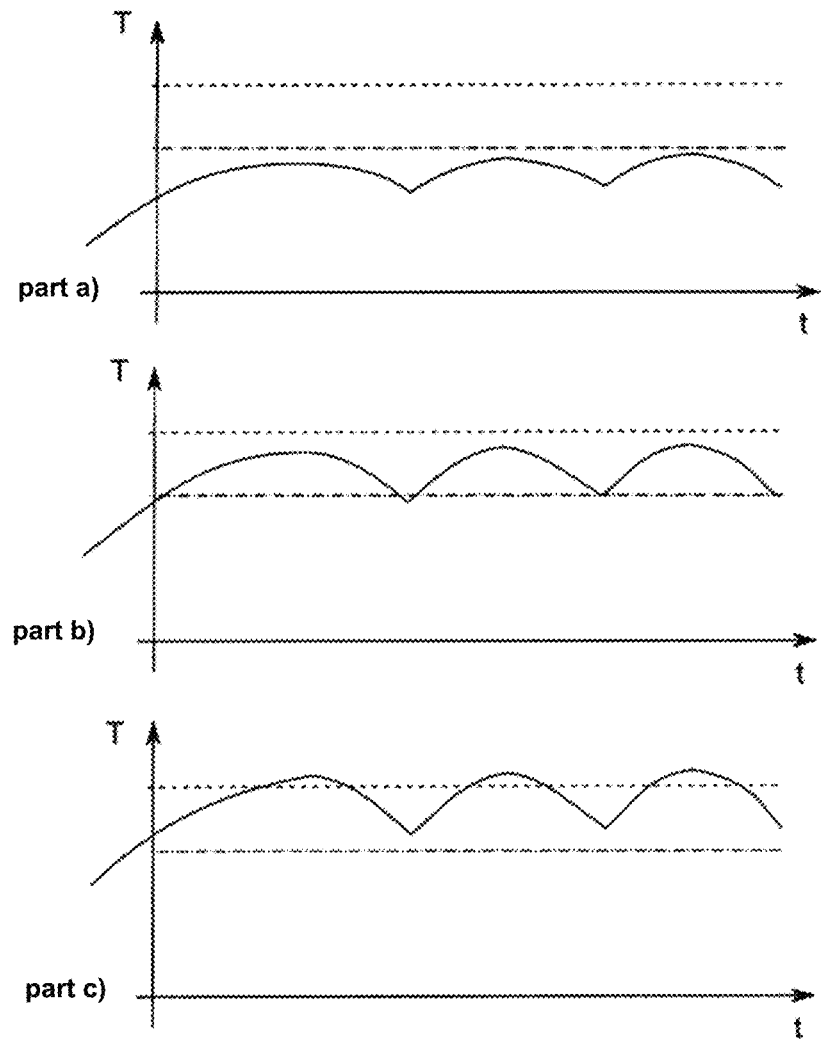
FIG. 7 is a drawing showing illustrative temperature diagrams with respect to melting and solidification temperatures.

The above-described temperature curves now need to be regarded in three areas on the construction field: In the component area (103), the same conditions apply as shown in FIG. 2. part b. The temperature in that area is raised above the sintering temperature for brief periods at a time. In contrast thereto, FIG. 7, part a shows the temperature in the unprinted area. It may even be considerably below the recrystallization temperature because the peripheral area (301) is not raised above the sintering temperature and, thus, does not enable any power transmission. The curve in FIG. 7, part b shows the temperature in the peripheral area (301) of the component. Here, the temperature should be above the recrystallization temperature and below the sintering temperature so that the heat transfer cannot cause the component area to drop below the recrystallization temperature and said area can be easily removed after the construction process.

Example 2: Greyscale Print Head

A device comprising a greyscale print head is more precise in use. These print heads are common and well-known in the print media sector. They allow the apparent resolution to be increased in this sector, thus achieving a better image quality.

In 3D printing, this increase in resolution does not have a direct effect. However, according to the invention, this technique can be used to introduce different amounts of liquid in the component (103) and jacket (301) areas. For instance, the amount of liquid introduced in the jacket area may be set to 50% of that introduced in the component area. Data transmission is effected by the use of a polychromatic raster bitmap. As a minimum, another raster bitmap can be defined which contains the data for the peripheral area. The electronic system of the print head then considers the respective bits as greyscale information.

Example 3: Material System Comprising a Separating Agent

Further essential degrees of freedom result for the invention if several different liquids are used for printing.

For this purpose, the device according to the invention has to be extended. A second print head (508) is used which can print the second absorber. In this case, the data path in the control unit of the machine need not be changed. The data is divided up electronically before the respective print head. This print head need not be a separate physical unit, but can be part of the print head (100) of the device.

The second absorber liquid may contain an oil, for example, which serves as a separating agent. This separating agent deposits between the individual particles and prevents their contact with the molten base material. In the case of polyamide 12 as base material, a certain amount of silicone oil in the printing liquid may serve as separating agent. This oil must be maintained as a suspension with the rest of the ink which additionally includes the absorber.

An example of such composition is:
80% propylene glycol
14% polyethylene glycol 400
5% nanoscale graphite
1% emulsifier Since the oil has a high boiling point, it does not evaporate during the sintering operation. In the jacket area (301), no sintering of the particles is possible. However, the oil produces an peripheral layer which adheres to the component and is easy to remove when unpacking the components. It can be removed separately from the rest of the powder. This avoids major contamination of the powder during further cycles.

This liquid is imprinted in the peripheral area (301) in the same amount as the liquid in the component area (103). In this example, the liquid in the component area (103) is composed of:
- 95% propylene glycol
- 5% nanoscale graphite.

Example 4: An Advantageous Combination of Constructional Features

1) An assembly consisting of 6 thermal radiation-emitting elements of the FTE Ceramicx type based on ceramics, having a peak wavelength of 5 µm, and mounted at a distance of 175 mm above a 330 mm×230 mm construction platform, i.e. elements with a basic power of 300 Watt and a size of 245 mm×60 mm×31 mm each, which are operated at a power of 50%. The assembly provides a constant basic temperature of the untreated powder of 175° C. on the surface. The elements are mounted centrally above the edge of the construction platform, thus ensuring the homogeneity of the temperature over the entire area of the powder present on the construction platform and preventing cooling of the edges of the construction platform.

2) A silicone-based heating mat with a maximum power of 400 W, mounted in a planar manner on the underside of the construction platform, and controlled to a constant temperature of 175° C., serves to reach the basic temperature for powder coating homogeneously and to keep said temperature constant over time.

3) A halogen heat emitter, type QHM, manufactured by Freek GmbH, with a maximum power of 1.6 kW and a peak wavelength of 1 µm, mounted on the rear surface of the oscillating blade recoater at a distance of 55 mm above the powder layer. The power of the emitter is changed according to its position while passing over the powder coating. 1.5 kW while passing over the powder wetted with an infrared light-absorbing liquid, so as to increase the temperature of the powder to above the melting temperature, approx. 200° C. in this case; 0.3 kW during application of the next layer so as to keep it from cooling, otherwise in the deactivated state.

4) Another ceramic-based emitter of the FTE Ceramicx type and identical in size serves to preheat the reservoir of the oscillating blade recoater which contains polyamide powder for coating. Thus, the temperature of the powder is adjusted to 70° C. This allows the temperature and flowability of the powder to be kept constant throughout the construction process. A temperature below the glass transition further guarantees constant flowability, thus ensuring smooth powder application by means of the oscillating blade recoater.

5) The structure has two axle systems, each equipped with a drive and being able to pass over the construction platform with the powder coating. One axle, with a rest position on one side, on the left in this case, of the construction platform, includes the oscillating blade recoater on the left-hand side, as well as the halogen emitter on the right-hand side, i.e. the side facing away from the oscillating blade recoater. The second axle includes the print head, which can be additionally moved perpendicular to the axle system so as to ensure strip printing of the entire powder surface. The cyclic sequence of the layered printing process is structured as follows:

1) Recoater axle passes over the construction platform=sintering pass. Lamp power: 1.5 kW, speed: 60 mm/s.
2) Construction platform is lowered by the layer height of 150 µm
3) Recoater axle passes over the construction platform again, returning to its rest position, with simultaneous coating by means of the activated oscillating blade recoater. Lamp power: 0.3 kW, speed: 40 mm/s=recoating and heating pass
4) Print head axle passes over the construction platform into the printing start position.
5) Print head axle returns to its rest position. At the same time, type 1001 print head, manufactured by XAAR, is activated, thus wetting the powder surface with absorber in the desired locations.

The fluid used for wetting the powder surface consists of a commercially available, oil-based soot particle ink, e.g. IK821 manufactured by XAAR, whose absorption maxima are outside the wavelengths emitted by the ceramic heat emitters and is therefore heated to exactly the same extent as the unwetted powder. Since the absorption of the printing fluid increases considerably at wavelengths of less than 2 µm, the emissions of the halogen heat emitter are absorbed by the wetted powder to a much greater extent than by unwetted powder, because the latter reflects almost completely in the wavelength range below 2 µm. Any energy of the emitter absorbed nevertheless in the unwetted locations serves to maintain the basic temperature of the powder surface.

Example 5: Use of Printing Fluid with an Advantageous Absorption Spectrum

Another means of increasing the selectivity of the construction process, thereby maximizing both the strength of the structures to be generated and also the removability of unwetted particulate material, consists in using printing fluids with an advantageous absorption spectrum, so that particulate material wetted with them can be heated by means of a defined infrared emitter spectrum to the greatest possible extent. Preferably, a printing fluid is selected whose absorption spectrum differs considerably from the particulate material used. This enables more sensitive control both of the basic temperature of the powder surface and of the melting temperature of the wetted surface, without having to take the constructive effort of providing an infrared emitter specially tailored for the ideal spectrum.

An exemplary embodiment is characterised by:
- Printing fluid on the basis of [C47 H47 Cl N2 O3 S] (CAS #134127-48-3) with an absorption maximum of 815 nm, dissolved in methanol, e.g. ADS830AT manufactured by American Dye Source
- Infrared emitters in the form of commercially available quartz halogen emitters with a peak wavelength of 0.9-1.2 µm, preferably as sintering lamp
- Infrared emitters in the form of carbon infrared emitters with a peak wavelength of 1.9-2.7 µm, preferably as overhead heat emitters, and/or additional sintering emitters, e.g. manufactured by Heraeus Noblelight.

The replacement of the overhead ceramic emitters with the carbon infrared emitters is advantageous here because the latter have a shorter reaction time, which makes the process temperature easier to control.

What is claimed is:

1. A device suitable for layer-wise producing 3D parts comprising:
   a construction platform;
   a construction space over the construction platform;
   a particulate construction material in
   a coater for applying the particulate construction material into the construction space in layers for building a feedstock having a top layer;
   an absorber in
   a printer for selectively applying the absorber onto the top layer of the feedstock; and
   a construction container having side walls surrounding the construction space;
   wherein the device is temperature-controllable for high-speed sintering, wherein the device includes a stationary overhead lamp for heating the applied layer of the particulate construction material to a temperature in a sintering window of the particulate construction material and two or more sintering lamps that move over the feedstock for selectively fusing the particulate construction material that is selectively printed with the absorber;
   wherein the absorber enhances the absorption of radiation relative to the particulate construction material;
   wherein the printer includes a greyscale print head, wherein a data transmission is effected by the use of a polychromatic raster bitmap and an electronic system of the print head considers bits of the bitmap as greyscale information.

2. The device of claim 1, wherein the stationary overhead lamp is positioned above the coater and printer, for heating the particulate construction material applied by the coater,
   wherein the sintering lamps selectively heats a portion of the top layer including the absorber.

3. The device of claim 1, wherein the device includes an insulation below the construction platform for insulating a bottom of the construction platform and/or the side walls of the construction container are insulated.

4. The device of claim 3, wherein the device includes resistance heaters below the construction space for heating the construction platform and/or the device includes resistance heaters for heating the side walls of the construction container.

5. The device of claim 1, wherein the two sintering lamps includes a first sintering lamp and a second sintering lamp having different radiation spectra.

6. The device of claim 1, wherein the stationary overhead lamp is positioned above the coater and printer, for heating the particulate construction material applied by the coater,
   wherein the sintering lamps selectively heats a portion of the top layer including the absorber.

7. The device of claim 5, wherein the first sintering lamp has a wavelength of about 0.5 to about 1.5 μm.

8. The device of claim 7, wherein the overhead lamp has a wavelength of about 3 to about 8 μm.

9. The device of claim 6, wherein the particulate construction material is characterized by a sintering window defined by a solidification point and a melting temperature of the material, and heating and insulation of the device maintains the feedstock at a temperature above the solidification point throughout the production of the 3D part, the sintering lamp temporarily heats a region of the top layer with the absorber to a temperature above the sintering window for selectively melting the particulate construction material.

10. The device of claim 1, wherein the two sintering lamps includes a first sintering lamp that operates when moving in a first direction and a second sintering lamp that operates when moving in a different direction.

11. The device of claim 1, wherein the two sintering lamps have different power and/or different wavelength spectra and two sintering lamps are both on a same side of the coater, wherein the device includes a temperature control system including a pyrometer.

12. The device of claim 1, wherein the coater includes an electric resistance heater.

13. The device of claim 1, wherein one of the two sintering lamps is activated and the other sintering lamp is deactivated during a pass in one direction.

14. The device of claim 1, wherein the two sintering lamps includes a first sintering lamp having a first emitter and a second sintering lamp including a second emitter, wherein the first emitter has a medium wavelength spectrum, and the second emitter has a near-infrared spectrum, a short wavelength spectrum or a long wavelength spectrum; wherein the two sintering lamps are directly connected and/or move together.

15. The device of claim 1, wherein the absorber includes a nanoscale graphite, and the graphite is suspended in a printing liquid including propylene glycol;
   wherein the printing liquid is in the printer.

16. The device of claim 1, wherein the device includes a ceramic thermal radiation-emitting elements having a peak wavelength of 5 μm that provides a constant basic temperature of the particulate material without absorber of 175° C. on the surface, said radiation-emitting elements mounted centrally above the construction platform for ensuring homogeneity of the temperature over the entire surface.

17. A device suitable for layer-wise producing 3D parts comprising:
   a construction platform;
   a construction space over the construction platform;
   a particulate construction material in
   a coater for applying the particulate construction material into the construction space in layers for building a feedstock having a top layer;
   an absorber in
   a printer for selectively applying the absorber onto the top layer of the feedstock;
   a construction container having side walls surrounding the construction space;
   an overhead lamp;
   a first emitter connected to the printer or coater so that the first emitter moves over the construction space with the printer or the coater; and
   a second emitter connected to the printer or coater so that the second emitter moves over the construction space with the printer or the coater;
   wherein the device is for high speed sintering of the 3D part;
   wherein the construction container is insulated and/or includes heating elements;
   wherein the absorber enhances the absorption of radiation relative to the particulate construction material;
   wherein the printer includes a greyscale print head, wherein a data transmission is effected by the use of a polychromatic raster bitmap and an electronic system of the print head considers bits of the bitmap as greyscale information.

18. The device of claim 17, wherein the first emitter and the second emitter have different wavelength spectra.

19. The device of claim 17, wherein the first and second emitters move independently over the construction space;
　wherein a movement of the first emitter is coupled with the coater; and
　wherein a movement of the second emitter is coupled with the printer.

20. The device of claim 15, wherein the printer includes a print head having a binary droplet size.

21. The device of claim 17, wherein the first and second emitters both move with the printer, wherein the first and second emitters have different power and are controlled independently.

22. The device of claim 17, wherein the first emitter and the second emitter are on opposite sides of the printer.

\* \* \* \* \*